United States Patent Office 3,066,632
Patented Dec. 4, 1962

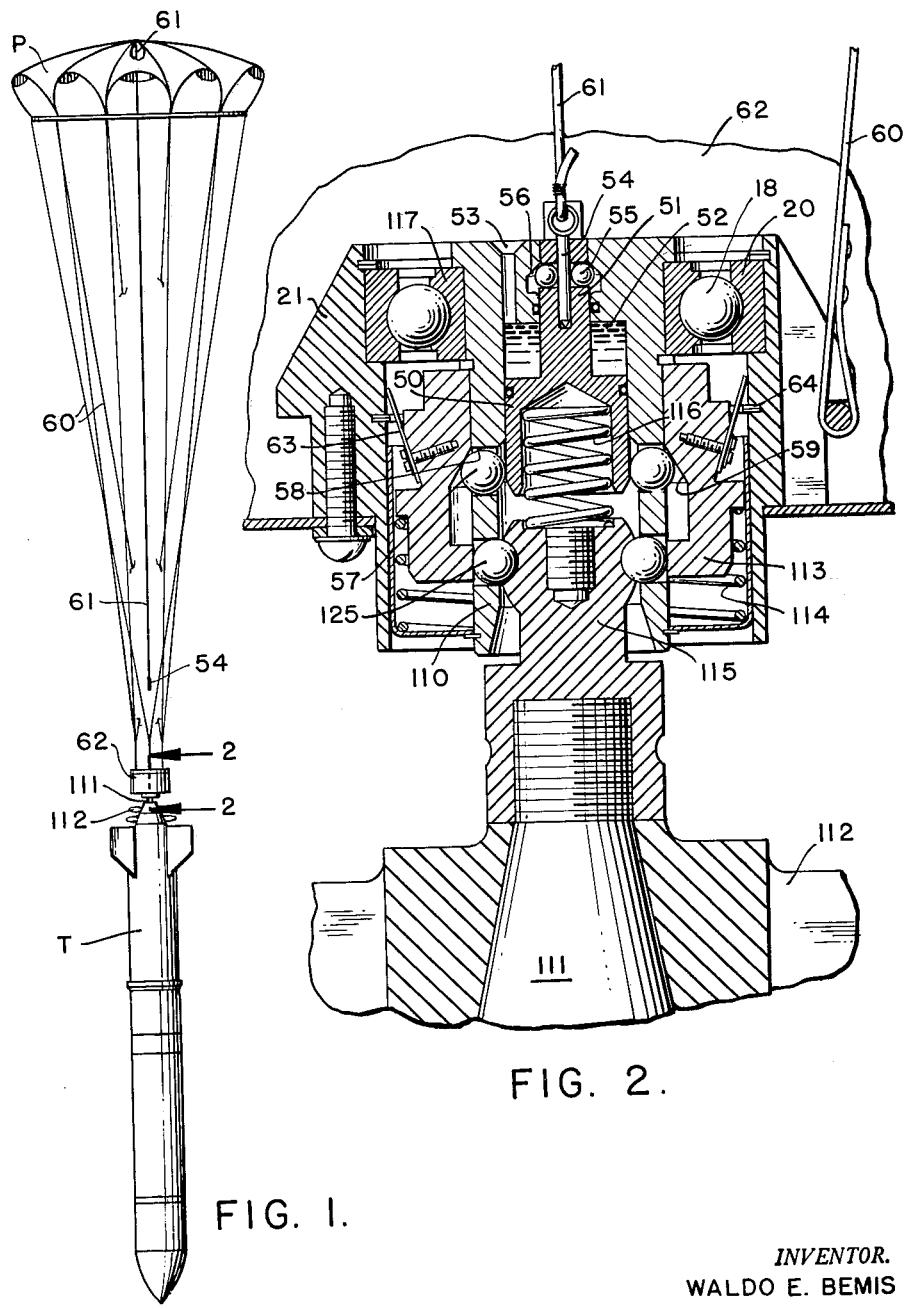

---

3,066,632
PARACHUTE RELEASE MECHANISM
Waldo E. Bemis, Wiesbaden, Germany, assignor to the United States of America as represented by the Secretary of the Navy
Filed Nov. 5, 1959, Ser. No. 851,203
5 Claims. (Cl. 114—20)
(Granted under Title 35, U.S. Code (1952), sec. 266)

The invention described herein may be manufactured and used by or for the Government of the United States of America for governmental purposes without the payment of any royalties thereon or therefor.

This invention relates to aerial launched torpedoes of the type having a device associated therewith for releasing an air stabilizer from the torpedo when the torpedo strikes the water and more particularly to improvements in release devices of the type exemplified by U.S. Patent 2,880,687, hereinafter referred to as the Kilvert patent.

In the Kilvert patent a device is disclosed which releases a parachute from a torpedo when the latter strikes the water, this being effected by an inertia actuated weight which releases locking balls. The present invention effects this release in the manner just described but differs in its operation for a short period of time after parachute opening. In the Kilvert patent the inertia weight is prevented from moving to a premature release position due to shock forces produced by parachute opening by the camming action of certain balls. While this operation is reliable in nearly all instances it has been found that it is not infallible in that some premature releases of torpedoes have occurred during the period between initial parachute opening and until the torpedo and parachute have become stabilized during their descent.

One of the objects of this invention is to provide improvements in the device referred to which infallibly prevents premature parachute release during the interval of time between initial parachute opening and until the parachute and its attached missile become stabilized during their descent.

Another object is to provide a hydraulically operated timing device which positively locks an inertia actuated weight against movement for an interval of time after opening of the parachute.

Other objects, advantages, and salient features will become more apparent from the description to follow, the appended claims, and the accompanying drawing, in which:

FIG. 1 is a side elevation of the subject of the invention illustrating the aerial fall of a torpedo and its attached parachute, and FIG. 2 is an enlarged section taken on line 2—2, FIG. 1.

Referring in detail to the drawing, and particularly to FIG. 2, which illustrates modifications of the device best illustrated in FIGS. 1A and 4A of the Kilvert patent and to which like reference characters have been applied, torpedo propeller 112 is affixed to propeller shaft 111 to which is threadedly secured plug member 115, which is locked to tubular member 110 by balls 125 and sleeve inertia weight 113, spring 114 urging weight 113 upwardly or rearwardly and spring 116 urging plug member 115 downwardly or forwardly. Upon entry of the torpedo into the water the operation is the same as described in the Kilvert patent, that is, weight 113 moves downwardly against the urge of spring 114, releasing balls 125, which permits the torpedo and its attached member 115 to separate from the remaining portions of the mechanism and its attached parachute.

In the Kilvert patent the upper end of spring 116 abuts member 110. In this invention the upper end of spring 116 abuts a piston 50 which is slideably contained in member 110. A piston stem 51, affixed to the piston, provides an annular space therearound containing a fluid 52, such as a silicone grease, which may be discharged through an aperture 53 when spring 116 urges piston 50 upwardly, the viscosity of the grease and size of the aperture being so chosen to provide a desired time delay in the movement of piston 50. To prevent unauthorized movement of the piston, a removable pin 54 is provided in the upper end of stem 51 which engages a plurality of angularly spaced balls 55, disposed in radial apertures in the stem and surrounding the pin, prevented from outward movement by annular surface 56. When pin 54 is removed, the balls may move inwardly and permit the stem and balls to move axially upwardly, thus permitting the piston to move in the same direction. A plurality of angularly spaced balls 57, disposed in radial apertures 58 in member 110, engage the piston and an annular cam surface 59 on weight 113. In the position shown the weight is positively restrained against downward movement of these balls.

The operation of the device at parachute opening and for a short time interval thereafter will now be described and the manner in which it differs from that in the Kilvert patent. As in the Kilvert patent, the lower ends of the parachute shroud lines 60 are secured to member 21 of the parachute pack or housing 62. A lanyard 61, not employed in the Kilvert patent, is attached at its upper end to the center of the canopy of parachute P and at its lower end to pin 54. Upon release of the missile from its carrier, which may be a rocket motor, a pilot parachute attached to the center of the canopy (not shown and also optional) opens which exerts a force on the canopy of parachute P, removing same from parachute pack housing 62, and effecting its opening to the position shown in FIG. 1. If the carrier is a rocket motor this position will be substantially horizontal rather than vertical, as shown. Since the lanyard is shorter than the shroud lines the opening of the canopy to its final position exerts a force on the lanyard thus removing pin 54 from its locking engagement with balls 55. The sudden opening of the parachute exerts a retarding force on the forward motion or descent of the torpedo T and weight 113 tends to move downwardly or forwardly to its release position. In the Kilvert patent this movement of the release weight is prevented by an outward camming action of balls 125 against their mating annular surface on weight 113 which, as will be apparent, is a frictional restraint only. As previously set forth, this restraint has not been found to be infallible and in some instances the weight moved downwardly and prematurely released the torpedo. In this invention, the weight still tends to move toward release position, but rather than be restrained by frictional forces only, is positively restrained against movement by balls 57 which positively lock the weight against movement so long as piston 50 remains in a position preventing radial inward movement of the balls. During this critical period of operation, and until the descent becomes stabilized, which in one exemplary missile system may vary between .8 and 2.8 seconds, movement of weight 113 remains prevented. During this period of stabilization spring 116 is urging piston 50 upwardly, discharging fluid 52 through aperture 53, thus providing a time delay device operative from the time pin 54 is removed by lanyard 61. When piston 50 moves upwardly to a position to permit inward movement of balls 57 the device is then in condition for release upon water entry of the torpedo in the same manner as in the Kilvert patent as previously described with one exception. In the Kilvert patent it was found that upon some conditions of water entry weight 113 failed to effect parachute release which was probably due to transient water entry forces producing rectilinear oscillation of the weight at the intended instant of release. To obviate such oscillations a plurality of angularly spaced flat springs 63 are affixed to weight 113, the free ends of which cam over and to a position beneath snap ring 64 when weight 113 moves downwardly upon water entry of the torpedo, this structure forming a locking detent for weight 113 to prevent its upward retrograde movement under urge of spring 114.

Another modification of the construction disclosed in the Kilvert patent resides in the manner of locking balls 125 to member 115. In the Kilvert patent member 115 is provided with a circumferential groove into which the balls partially extend when in locking position whereas in the present invention each ball engages a mating spherical depression in member 115. With this construction members 115 and 110 are locked against relative rotation which ensures that any relative rotation between the missile and parachute will occur between the inner and outer races 117, 20 of ball thrust bearing 18. The depressions thus serve the function of pin 22, FIGS. 1 to 4 of the Kilbert patent, in preventing undesired relative rotation between any of the release mechanism parts disposed between the inner race and the missile.

Obviously many modifications and variations of the present invention are possible in the light of the above teachings. It is therefore to be understood that within the scope of the appended claims the invention may be practiced otherwise than as specifically described.

What is claimed is:

1. In apparatus for releasably securing a trailing parachute to an aerial launched load and including a release device secured to the lower ends of the parachute shroud lines having an inertia actuated weight adapted to move to an unlocked position to release the parachute from the load upon rapid deceleration of the latter, the improvements in combination, comprising; means carried by said device for positively locking said weight against movement toward unlocked position in response to shock forces produced by opening of the parachute, whereby premature release of the parachute from the load is prevented, said means comprising a time delay device operatively connected to said weight and adapted to be initiated by opening of the parachute for preventing movement of said weight for a period of time sufficient to permit said parachute and load to become stabilized in descent, said time delay device adapted to condition said weight for permissive movement to unlocked position after lapse of said period of time.

2. Apparatus in accordance with claim 1 wherein said time delay device comprises a cylinder containing a fluid and having an outlet orifice, a spring urged piston in the cylinder adapted to discharge said fluid from said cylinder through said orifice, and a lanyard connected at one end to the center of the canopy of said parachute and at its other end to a part of said device operative to permit movement of said piston when said canopy opens.

3. Apparatus in accordance with claim 2 including a pin connected to said other end of said lanyard adapted to be withdrawn from said piston when said canopy opens, said pin adapted to free means for locking the piston against movement.

4. In apparatus for releasably securing a trailing parachute to an aerial launched load and including a release device secured to the lower ends of the parachute shroud lines having an annular inertia actuated weight adapted to move to an unlocked position to release the parachute from the load upon rapid deceleration of the load, the improvements in combination comprising; a cylinder containing fluid disposed within said weight and along which the weight is adapted to slide, said cylinder having an outlet orifice through which said fluid may be discharged, a piston within said cylinder adapted, when moved, to discharge said fluid through said orifice, a plurality of angularly spaced apertures extending through the wall of said cylinder, balls within said apertures engaging an annular inwardly facing surface on said weight and the outer surface of said piston adapted to positively prevent movement of said weight toward unlocked position while said piston engages said balls, a spring for urging said piston in a direction to discharge said fluid from the cylinder, locking means for preventing undesired movement of the piston, and means actuated by the center of the canopy of the parachute adapted to unlock said locking means to permit said spring to move said piston, the construction and arrangement being such that when said parachute opens said piston moves for a period of time under urge of said spring and moves to a position out of engagement with said balls, whereby said weight may move to unlocked position upon rapid deceleration of said load.

5. Apparatus in accordance with claim 4 wherein said locking means comprises an axially slideable pin adapted to be removed from said piston and said means actuated by the center of the canopy comprises a lanyard connecting the pin and the center of said canopy, and at least one ball engaging said pin and said cylinder, locking said piston against movement until said pin is removed therefrom.

References Cited in the file of this patent

UNITED STATES PATENTS

| | | |
|---|---|---|
| 2,778,308 | Fogal et al. | Jan. 22, 1957 |
| 2,837,370 | Stott et al. | June 3, 1958 |
| 2,842,392 | Haake | July 8, 1958 |
| 2,843,416 | Warren | July 15, 1958 |
| 2,880,687 | Kilvert | Apr. 7, 1959 |
| 2,933,340 | McDiarmid | Apr. 19, 1960 |

FOREIGN PATENTS

| | | |
|---|---|---|
| 1,039,847 | Germany | Sept. 25, 1958 |
| 574,283 | Canada | Apr. 21, 1959 |